(12) United States Patent
Omori et al.

(10) Patent No.: US 7,236,650 B1
(45) Date of Patent: *Jun. 26, 2007

(54) SIGNAL PROCESSING APPARATUS, METHOD OF THE SAME, AN IMAGE PROCESSING APPARATUS AND METHOD OF SAME

(75) Inventors: Shiro Omori, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1486 days.

This patent is subject to a terminal disclaimer.

(21) Appl. No.: 09/584,999

(22) Filed: Jun. 1, 2000

(30) Foreign Application Priority Data

Jun. 4, 1999 (JP) .............................. P11-157431

(51) Int. Cl.
G06K 9/00 (2006.01)
G06K 9/32 (2006.01)
G06K 9/40 (2006.01)

(52) U.S. Cl. .................... 382/299; 382/162; 382/264
(58) Field of Classification Search ................ 382/162, 382/167, 294, 298, 299, 264, 252; 708/300
See application file for complete search history.

(56) References Cited

U.S. PATENT DOCUMENTS 5,850,486 A * 12/1998 Maas et al. ................. 382/294
6,021,223 A * 2/2000 Toyoda et al. .............. 382/214
6,507,859 B1 * 1/2003 Omori et al. ............... 708/300
6,965,406 B1 * 11/2005 Ueda et al. ................. 348/252

OTHER PUBLICATIONS

Omorio et al., "High-resolution image using several sampling-phase shifted images—density doubling of single chip color CCD with pixel-shift technique", IEEE, 2000, pp. 178-179.*

* cited by examiner

Primary Examiner—Duy M. Dang
(74) Attorney, Agent, or Firm—Sonnenschein Nath & Rosenthal LLP

(57) ABSTRACT

An image processing apparatus capable of obtaining a high resolution image from a low resolution image without making processing in a camera signal processor complicated, wherein a CCD image sensor is moved by a CCD drive and a plurality of received light signals having mutually different sampling phases are generated in accordance with imaging results in the CCD image sensor, the received light signals are converted to image signals in an AD converter, the image signals are transformed to a frequency domain signal in a signal processor and multiplied with a plurality of respectively corresponding complex numbers stored in a memory, and the multiplied results are added to generate an image signal free from aliasing components.

12 Claims, 12 Drawing Sheets

8 SIGNAL PROCESSING PORTION

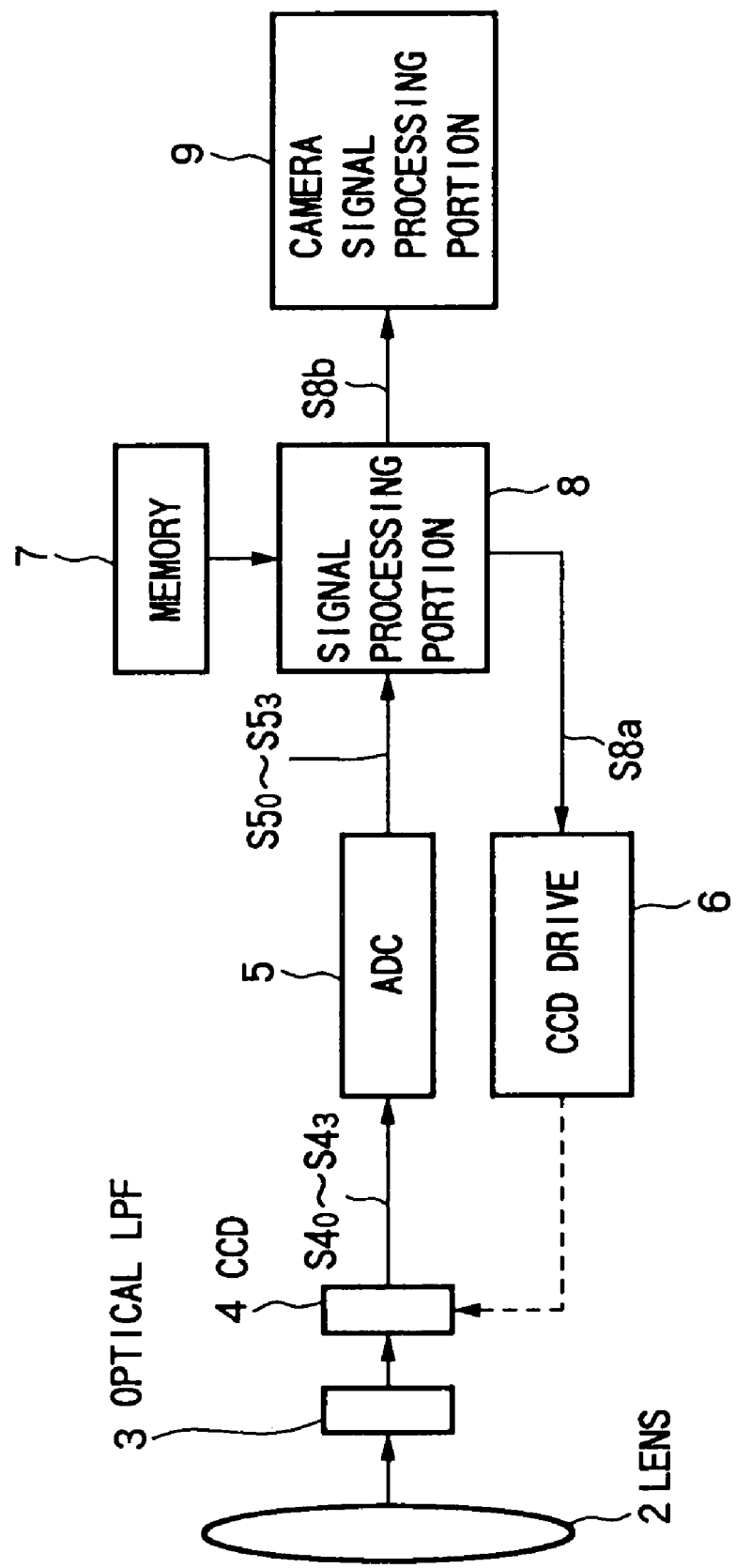

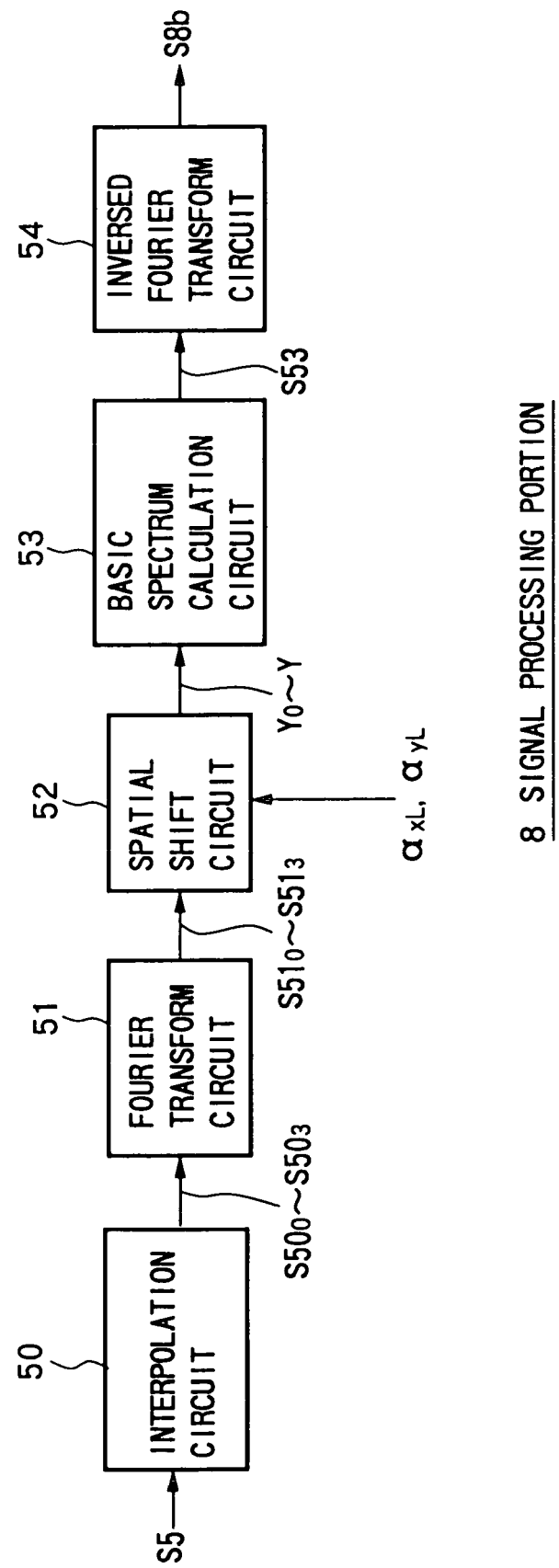

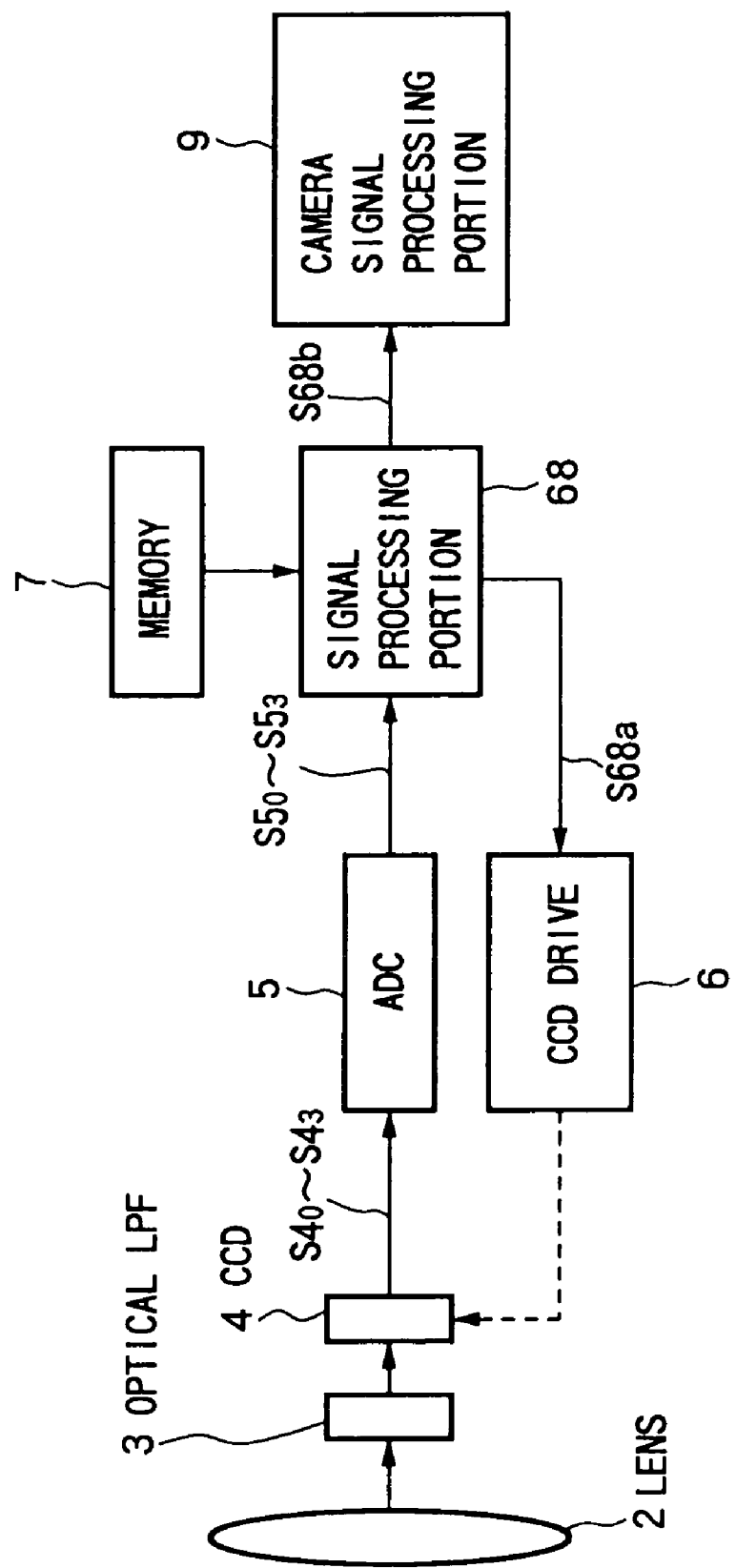

SIGNAL PROCESSING APPARATUS, METHOD OF THE SAME, AN IMAGE PROCESSING APPARATUS AND METHOD OF SAME

BACKGROUND OF THE INVENTION

1. Field of the Invention

The present invention relates to a signal processing apparatus and method using a difference in sampling phase for removing aliasing components and to thereby broaden the frequency band of a signal and an image processing apparatus and method for processing an image signal obtained by capturing a plurality of images having a predetermined difference in sampling phase by a single imaging element.

2. Description of the Related Art

In the related art, there has been a signal processing method in a charged coupled device (CCD) or other image sensor for obtaining a broad band image doubled in the number of pixels by inputting two images shifted by a pitch of exactly half of the sampling interval and up-sampling and adding the two. The signal processing method is applicable to a black and white CCD image sensor, triple-element RGB CCD image sensor, etc.

Also, there have been attempts to apply this to an image obtained by a single-element CCD image sensor having a color filter, currently the mainstream in video cameras and still image pickup devices (hereinafter also referred to as electronic still cameras). Since a single-element CCD image sensor has a color filter cycle of, for example, every two pixels etc., it has been considered to shift images by half of the cycle, that is, one pixel. A signal of an image captured by a single-element CCD image sensor and converted from an analog to digital format is processed in a later camera signal processor to generate an RGB signal or a luminance signal and a color difference signal using interpolation for each color or an interrelationship among the colors.

Summarizing the problem to be solved by the invention, in a single-element CCD image sensor, however, when shifting the pixels, the array of signals of the colors becomes different from the conventional array due to the increase in the number of pixels. The later camera signal processor therefore not only has to process an increased number of pixels, but also has to change the algorithm itself.

Also, when shifting the pixels by less than the pixel pitch of the CCD image sensor, there is the disadvantage that the camera signal processor has to process a signal with uneven sampling, so the processing becomes complex.

For example, when using a Bayer array single-element CCD image sensor obtaining a R (red), G (green), and B (blue) pixel array pattern shown in FIG. 12A to obtain a total of four images shifted one pixel each in the vertical, horizontal, and diagonal directions, the obtained pixel arrays of the R, G, B data become as shown in FIGS. 12E, 12F, and 12G, which are different from the normal pixel arrays shown in FIGS. 12B, 12C, and 12D.

Namely, as will be understood by comparing FIGS. 12C and 12D with FIGS. 12F and 12G, the numbers of samples of R data and B data are increased four times, while as is understood by comparing FIG. 12B and FIG. 12E, the number of samples of G data is only doubled.

Therefore, the camera signal processor has to process R, G, B data of the pixel arrays shown in FIGS. 12E, 12F, and 12G, so there is the disadvantage that the processing becomes complex.

Also, when shifting an image by less than the pixel pitch, the sampling intervals become uneven, so there is the disadvantage that the processing becomes difficult.

SUMMARY OF THE INVENTION

An object of the present invention is to provide an image processing apparatus and method capable of obtaining a high resolution image from a low resolution image without making the processing in the camera signal processor complex and a signal processing apparatus and method using the band broadening method used in the image processing apparatus etc.

To attain the above object, according to a first aspect of the present invention, there is provided a signal processing apparatus comprising a transforming means for transforming a plurality of first digital signals having mutually different sampling phases to generate a plurality of second digital signals in frequency domain; a memory means for storing a plurality of complex numbers corresponding to the sampling phases; and a processing means for multiplying the plurality of second digital signals and the plurality of complex numbers corresponding to the plurality of second digital signals and adding the multiplication results to generate a third digital signal free from aliasing components.

In the signal processing apparatus of a first aspect of the present invention, the transforming means transforms the plurality of first digital signals having mutually different sampling phases a plurality of second digital signals in the frequency domain.

Then, the processing means multiplies the plurality of second digital signals with a plurality of complex numbers stored in the memory means corresponding to the plurality of second digital signals and adds the multiplied results to generate third digital signals freed from aliasing components.

Preferably, the apparatus further comprises a phase shift means for shifting the phase of the first digital signals or the second digital signals by exactly a predetermined phase.

According to a second aspect of the present invention, there is provided a signal processing apparatus, comprising a phase shift means for shifting the phase of a plurality of first digital signals having mutually different sampling phases to generate second digital signals; a memory means for storing a plurality of real numbers indicating real parts and imaginary parts of a plurality of predetermined complex numbers corresponding to the sampling phases; a processing means for multiplying the first digital signals with real numbers indicating the real parts corresponding to the first digital signals to obtain first multiplied results, multiplying the second digital signals corresponding to the first digital signals with real numbers indicating the imaginary parts corresponding to the second digital signals to obtain second multiplied results, and adding the first multiplied results and the second multiplied results to generate third digital signals free of aliasing components.

According to a third aspect of the present invention, there is provided an image processing apparatus, comprising an image input means for generating a plurality of first image signals having mutually different sampling phases in accordance with imaging results; a transforming means for transforming the first image signals to a frequency domain to generate a plurality of second image signals; a memory means for storing a plurality of complex numbers corresponding to the sampling phases; a processing means for multiplying the plurality of second image signals with the plurality of complex numbers corresponding to the plurality of second image signals and adding the multiplied results to generate third image signals free from aliasing components.

Preferably, the image input means forms an image of a plurality of color lights passed through a single-plate type color filter on corresponding pixels among a plurality of pixels arranged in a matrix two-dimensionally to generate the first image signals comprised by color data of the plurality of colors; and the processing means performs the multiplication and the addition for every color data of the plurality of color data to generate a plurality of fourth image signals corresponding to the plurality of colors and generates the third image signals by using the plurality of fourth image signals.

More preferably, the sampling phase is determined for a predetermined one color among the plurality of colors in order that a sampling pattern of color data of the color included in the plurality of first image signals and a sampling pattern of color data included in the fourth image signals of the color become similar.

Preferably, the processing means comprises a spatial shift means for spatially shifting the second image signals in accordance with the sampling phases; a basic spectrum calculation means for multiplying the spatially shifted plurality of second image signals with the plurality of complex numbers corresponding to the plurality of second image signals and adding the multiplied results to calculate a basic spectrum free from aliasing components; and an inverse transforming means for transforming the basic spectrum from a frequency domain to a time domain to generate the third image signals.

Alternatively, preferably the apparatus further comprises a drive means for moving the image input means physically, optically, or electrically so that the image input means can generate a plurality of image signals having mutually different sampling phases in accordance with the imaging results.

Alternatively, more preferably the image input means is a single-element CCD image sensor and the color filter is a primary color filter or a color compensation filter.

According to a fourth aspect of the present invention, there is provided an image processing apparatus, comprising an image input means for receiving as input a plurality of first image signals having mutually different sampling phases in accordance with imaging results; a phase shift means for shifting the phase of the plurality of first digital signals to generate second digital signals; a memory means for storing a plurality of real numbers respectively indicating real parts and imaginary parts of a plurality of predetermined complex numbers corresponding to the sampling phases; a processing means for multiplying the first digital signals with real numbers indicating the real parts corresponding to the first digital signals to obtain first multiplication results, multiplying the second digital signals corresponding to the first digital signals with real numbers indicating the imaginary parts corresponding to the second digital signals to obtain second multiplied results, and adding the first multiplied results and the second multiplied results to generate third digital signals free from aliasing components.

According to a fifth aspect of the present invention, there is provided a signal processing method comprising transforming a plurality of first digital signals having mutually different sampling phases to a frequency domain to generate a plurality of second digital signals; multiplying the plurality of second digital signals with a plurality of complex numbers corresponding to the plurality of second digital signals; and adding the multiplied results to generate third digital signals free from aliasing components.

According to a sixth aspect of the present invention, there is provided a signal processing method using a plurality of real numbers indicating real parts and imaginary parts of a predetermined plurality of complex numbers corresponding to sampling phases, comprising shifting a plurality of first digital signals having mutually different sampling phases by predetermined phases to generate second digital signals; multiplying the first digital signals with real numbers indicating the real parts corresponding to the first digital signals to generate first multiplied results; multiplying the second digital signals corresponding to the first digital signals with real numbers indicating the imaginary parts corresponding to the second digital signal to generate second multiplied results; and adding the first multiplied results and the second multiplied results to generate third digital signals free of aliasing components.

According to a seventh aspect of the present invention, there is provided an image processing method comprising generating a plurality of first image signals having mutually different sampling phases in accordance with imaging results; converting the first image signals to a frequency domain to generate a plurality of second image signals; and multiplying the plurality of second image signals with a plurality of complex numbers corresponding to the plurality of second image signals and adding the multiplication results to generate third image signals free from aliasing components.

Preferably, the method further comprises forming an image of a plurality of color lights passing through a single-plate type color filter on corresponding pixels among a plurality of pixels arranged in a matrix two-dimensionally to generate the first image signals comprised by color data of the plurality of colors and performing the multiplication and the addition for every color data of the plurality of colors to generate a plurality of fourth image signals corresponding to the plurality of colors and generate the third image signals by using the plurality of fourth image signals.

More preferably, the method further comprises determining the sampling phase for a predetermined one color among the plurality of colors so that a sampling pattern of color data of the color included in the plurality of first image signals and a sampling pattern of color data included in the fourth image signals of the color become similar.

According to an eighth aspect of the present invention, there is provided an image processing method using a plurality of real numbers prepared in advance indicating real parts and imaginary parts of a predetermined plurality of complex numbers corresponding to sampling phases, comprising generating a plurality of first image signals having mutually different sampling phases in accordance with imaging results; shifting by a predetermined phase the plurality of first digital signals to generate second digital signals; multiplying the first digital signals with real numbers indicating the real parts corresponding to the first digital signals to generate first multiplied results; multiplying the second digital signals corresponding to the first digital signals with real numbers indicating the imaginary parts corresponding to the second digital signals to generate second multiplied results; and adding the first multiplied results and the second multiplied results to generate third digital signals free of aliasing components.

BRIEF DESCRIPTION OF THE DRAWINGS

These and other objects and features of the present invention will become clearer from the following description of the preferred embodiments given with reference to the accompanying drawings, in which:

FIG. 2 is a view of a part of the configuration of the electronic still camera of the first embodiment of the present invention;

FIG. 6 is a view of the configuration of the signal processor shown in FIG. 2;

FIG. 7 is a view of a part of the configuration of an electronic still camera of a second embodiment of the present invention;

DESCRIPTION OF THE PREFERRED EMBODIMENTS

Below, an electronic still camera according to the present embodiments will be explained.

First Embodiment

An electronic still camera of the present embodiment is provided with an RGB Bayer array single-mode CCD image sensor and processes four sets of RGB data different in sampling phases obtained by the CCD image sensor using a predetermined band broadening method to increase the resolution and thereby obtain RGB data having a double bandwidth corresponding to double the number of pixels vertically and horizontally.

Figure 1A:
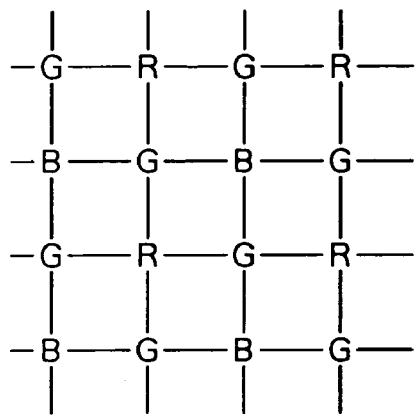
FIGS. 1A, 1B, 1C, 1D and 1E are views for explaining an RGB Bayer array single-element CCD image sensor used in an electronic still camera of a first embodiment of the present invention.
Figure 1B:
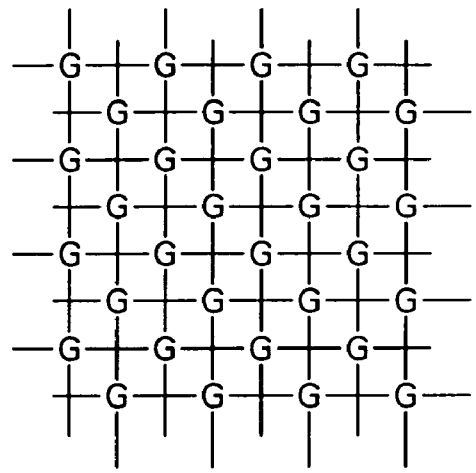
Figure 1C:
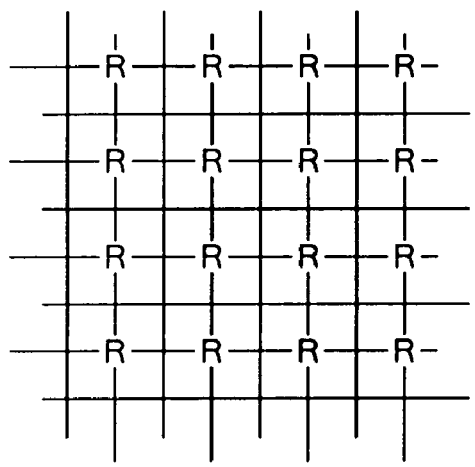
Figure 1D:
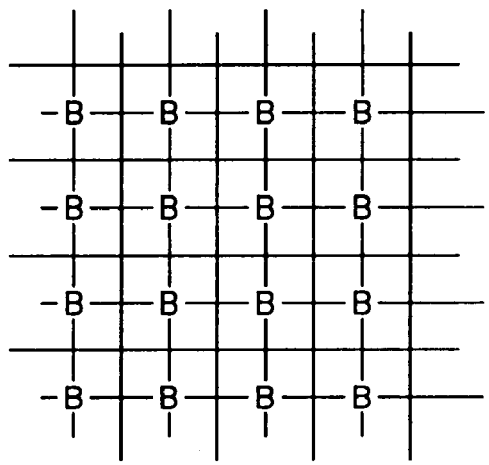
Figure 1E:
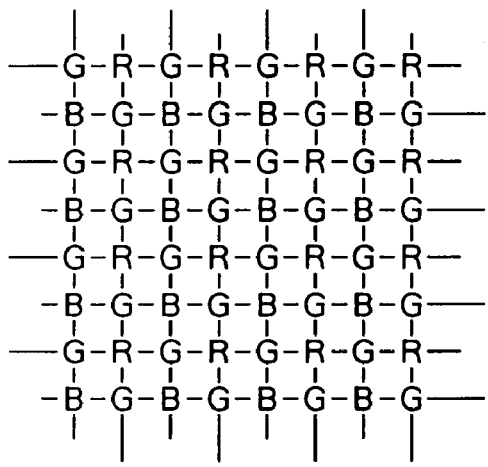

Specifically, the electronic still camera obtains G data, R data, and B data of the pixel arrays shown in FIGS. 1B, 1C, and 1D from the four sets of RGB data different in sampling phase, including the RGB data of the pixel array shown in FIG. 1A, and add these to obtain the RGB data of the pixel array shown in FIG. 1E.

FIG. 2 is a view of a part of the configuration of an electronic still camera of the present embodiment.

As shown in FIG. 2, the electronic still camera 1 comprises a lens 2, an optical LPF 3, a CCD image sensor 4, an AD converter 5, a CCD drive 6, a memory 7, a signal processor 8, and a camera signal processor 9.

[Optical LPF 3]

The optical LPF 3 is an optical low pass filter (LPF) for removing unnecessary high band components from light from the object being photographed passing through the lens 2.

[CCD 4]

The CCD image sensor 4 comprises a plurality of photodiodes arranged in a matrix and a Bayer color filter array. The Bayer color filter array is comprised of G (green) color filters arranged in a checkerboard pattern and R (red) filters and B (blue) filters arranged in a checkerboard pattern in the remaining parts. The photodiodes receive light passing through the Bayer color filter array and convert the light to electrical signals to generate received light signals $S4_0$ to $S4_3$ in accordance with the amount of received light and outputs the received light signals $S4_0$ to $S4_3$ to the AD converter.

The CCD image sensor 4 is, as will be explained later on, driven to move by the CCD drive 6 and captures four images different in sampling phases for obtaining a single high resolution image.

[AD Converter 5]

The AD converter 5 converts the received light signals $S4_0$ to $S4_3$ to image signals $S5_0$ to $S5_3$ and outputs an image signal S5 to the signal processor 8.

[CCD Drive 6]

Figure 3:
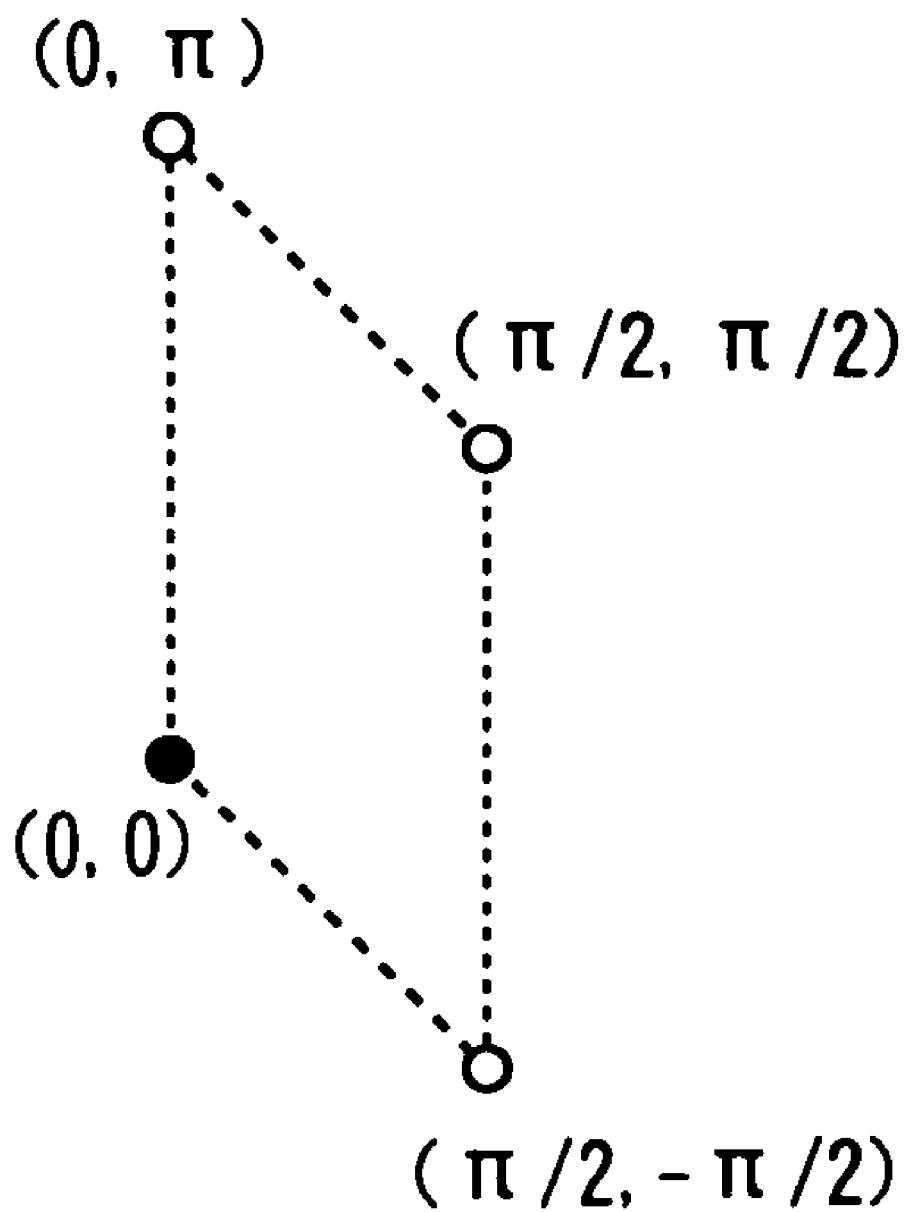
FIG. 3 is a view for explaining a sampling phase of four images captured by a CCD image sensor shown in FIG. 2 for obtaining one high resolution image.

The CCD drive 6 physically moves the CCD image sensor 4 by exactly a predetermined distance in a predetermined direction based on a control signal S8a from the signal processor 8 so that the CCD image sensor 4 captures a total of four images respectively having phases of $(0, 0)$, $(\pi/2, -\pi/2)$, $(0, \pi)$, $(\pi/2, \pi/2)$ when assuming sampling intervals of the CCD image sensor 4 to be $2\pi$ and the phase of one image to be the origin $(0, 0)$ as shown in FIG. 3.

The signal processor 8 uses the image signal S5 of the four captured images having mutually different sampling phases as shown in FIG. 3 input from the AD converter 5 to generate an image signal S8b of an image having double the number of pixels in the vertical and horizontal directions.

Here, the image signal S5 is composed of the pixel data of pixels arranged in the matrix constituting the CCD image sensor 4. Pixel data of pixels at positions indicated by "G" in FIG. 4A indicate G (green) data, pixel data of pixels at the positions indicated by "R" in FIG. 4B indicate R (red) data, and pixel data of pixels at the positions indicated by "B" in FIG. 4C indicate B (blue) data.

The signal processor 8 writes the image signal S5 of the four captured images input from the AD converter 5 in the memory 7, then reads it out and processes the image signal S5 by a later explained band broadening method to generate an image signal S8b so as to generate R data and B data of the pixel array patterns shown in FIGS. 1C and 1D from R data and B data of the pixel array patterns shown In FIGS. 4B and 4C.

Figure 4A:
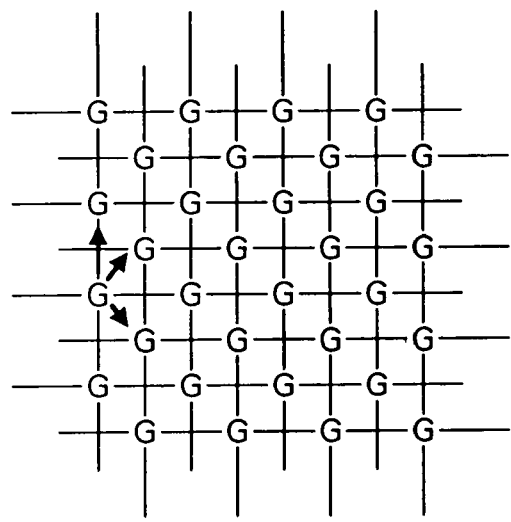
FIGS. 4A, 4B, and 4C are views for explaining processing in a signal processor shown in FIG. 2.

Note that the pixel array pattern of G data shown In FIG. 4A and the pixel array pattern of G data shown In FIG. 1B are the same, so no processing is necessary for the G data. Namely, the signal processor 8 uses the G data included In the image signal S5 as it is as the G data of the Image signal S8b.

Also, the signal processor 8 generates a control signal S8a based on information on the direction of movement and distance of the CCD image sensor 4 stored in the memory 7 in advance so as to obtain four captured Images having mutually different sampling phase shown In FIG. 3 and outputs the control signal S8a to the CCD drive 6.

Below, the processings for generating R data and B data of the image signal S8*b* In the signal processor 8 will be explained.

Note that the processings for generating R data and B data are the same except for the value of the sampling phase.

Here, the "sampling phase" indicates the coordinates of a pixel corresponding to pixel data of a certain color Included In the Image signal S5 of the four captured images when assuming the position of a certain pixel corresponding to pixel data of that color included in the image signal S8*b* to be the origin.

Figure 5A:
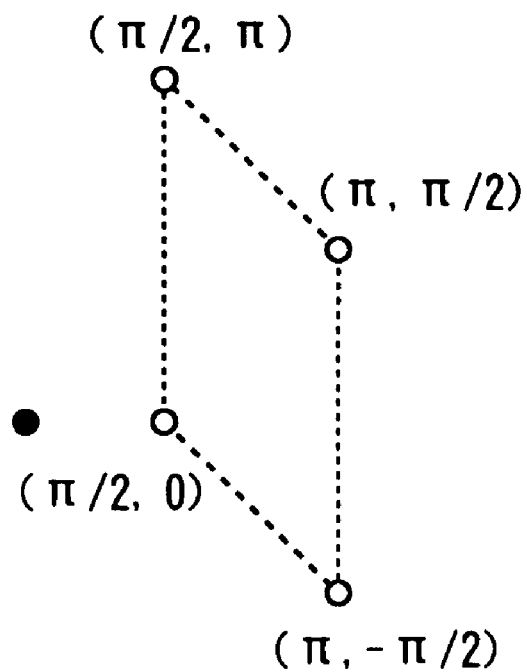
FIG. 5A is a view for explaining a sampling phase of R data to be processed in a signal processor shown in FIG. 2

Specifically, for the R data, the sampling phases of the four captured images, as shown in FIG. 5A, respectively become $(\alpha_{x0}\cdot\alpha_{y0})=(\pi/2, 0)$, $(\alpha_{x1}\cdot\alpha_{y1})=(\pi, -\pi/2)$, $(\alpha_{x2}\cdot\alpha_{y2})=(\pi/2, \pi)$, and $(\alpha_{x3}\cdot\alpha_{y3})=(\pi, \pi/2)$.

Figure 5B:
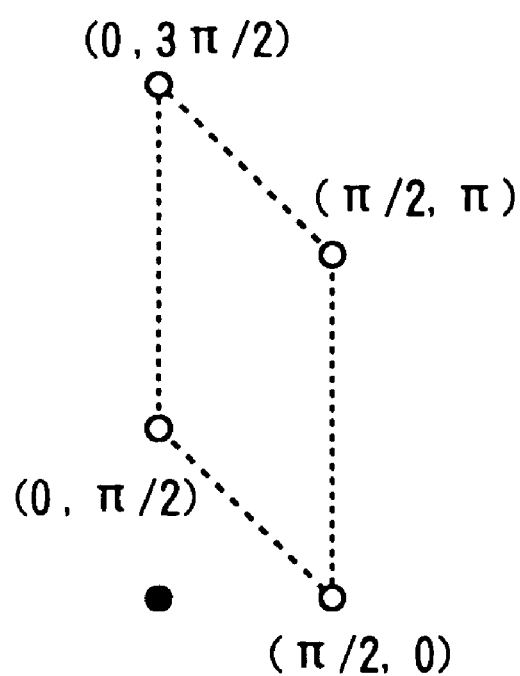
FIG. 5B is a view for explaining a sampling phase of B data to be processed in the signal processor shown in FIG. 2.

Also, for the B data, the sampling phases of the four captured images, as shown in FIG. 5B, respectively become $(\alpha_{x0}\cdot\alpha_{y0})=(0, \pi/2)$, $(\alpha_{x1}\cdot\alpha_{y1})=(\pi/2, 0)$, $(\alpha_{x2}\cdot\alpha_{y2})=(0, 3\pi/2)$, and $(\alpha_{x3}\cdot\alpha_{y3})=(\pi/2, \pi)$.

The values of these sampling phases are used as $(\alpha_{x0}\cdot\alpha_{y0})$ to $(\alpha_{x3}\cdot\alpha_{y3})$ at the time of the later explained spatial shifting and are stored in the memory 7 shown in FIG. 2 in advance.

FIG. 6 is a view of the configuration of the signal processor 8.

As shown in FIG. 6, the signal processor 8 comprises an interpolation circuit 50, a Fourier transform circuit 51, a spatial shift circuit 52, a basic spectrum calculation circuit 53, and an inverse Fourier transform circuit 54.

The interpolation circuit 50 receives as inputs image signals $S5_0$ to $S5_3$ of the four captured images to obtain one high resolution image, interpolates these and up-samples them two-fold to generate image signals $S50_0$ to $S50_3$, and outputs the image signals $S50_0$ to $S50_3$ to the Fourier transform circuit 51.

Specifically, the interpolation circuit 50 inserts $(M_x-1)$ number of "0's" between the sampling positions in the x direction and $(M_y-1)$ number of "0's" between the sampling positions in the y direction for the image signals $S5_0$ to $S5_3$ to generate the image signals $S50_0$ to $S50_3$.

Note that $M_x$ and $M_y$ are multiples indicating how many multiples of frequency components for restoration to in the x direction and y direction with respect to the Nyquist frequency. In the present embodiment, both are "2".

The Fourier transform circuit 51 converts the image signals $S50_0$ to $S50_3$ input from the interpolation circuit 50 to generate image signals $S51_0$ to $S51_3$ of a frequency domain expression and outputs the image signals $S51_0$ to $S51_3$ to the spatial shift circuit 52.

Figure 4B:
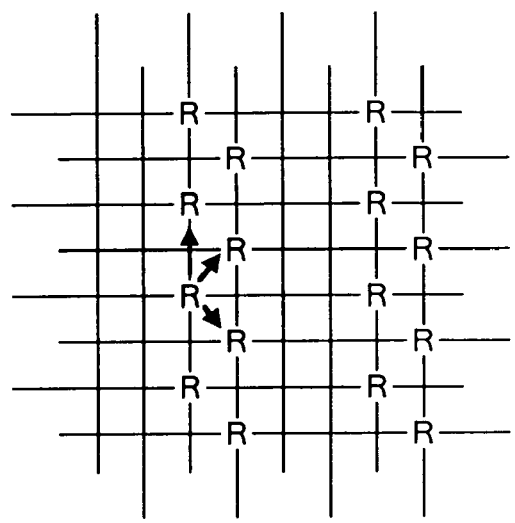
Figure 4C:
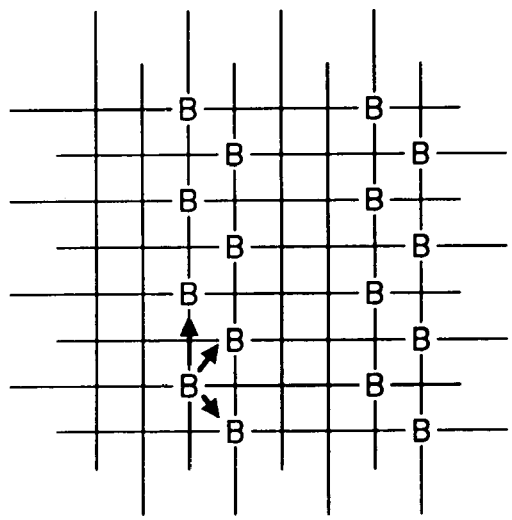

The spatial shift circuit 52 performs two-dimensional spatial shifting on the R data and B data included in the image signals $S51_0$ to $S51_3$ obtained by imaging to generate image signals $Y_0$ to $Y_3$ to express that sampling was performed in the positions of FIGS. 4B and 4C.

Namely, the spatial shift circuit 52 multiplies R data and B data of the image signals $S51_0$ to $S51_3$ with $\exp(-j(\omega_x\alpha_{x0}+\omega_y\alpha_{y0})/(2\pi))$ to $\exp(-j(\omega_x\alpha_{x3}+\omega_y\alpha_{y3})/(2\pi))$. respectively, to generate image signals $Y_0$ to $Y_3$.

Note that, at this time, the portion above the Nyquist frequency indicates negative frequencies both in the x direction and y direction. The $\omega x$ or $\omega y$ in this portion has to be made $(\omega_x-\omega_{sx})$ or $(\omega_y-\omega_{sy})$ Here, $\omega_{sx}$ and $\omega_{sy}$ respectively are sampling frequencies in the x direction and y direction before up-sampling.

The basic spectrum calculation circuit 53 uses the image signals $Y_0$ to $Y_3$ input from the spatial shift circuit 52 and complex numbers $w_0$ to $w_3$, $w_0'$ to $w_3'$ stored in the memory 7 shown in FIG. 2 to separately generate the two-dimensional image signals $X_{0,0}$ of the R data and B data and outputs the image signal S53 comprised of the generated image signals $X_{0,0}$ of the R data and B data and the G data of a pixel in the position shown in FIG. 4A to the inverse Fourier transform circuit 54.

Note that the memory 7 stores, for each of the R data and B data generated as explained later, the complex numbers $w_0$ to $W_3$ to be multiplied with the image signals $Y_0$ to $Y_3$ for finding the basic spectrum components $X13_{0,0}$ in the first and third quadrants and the complex numbers $w_0'$ to $w_3'$ to be multiplied with the image signals $Y_0$ to $Y_3$ for finding the basic spectrum components $X24_{0,0}$ of the second and fourth quadrants.

The basic spectrum calculation circuit 53 obtains basic spectrum components $X13_{0,0}$ not containing aliasing components based on the formula (1) below and obtains basic spectrum components $X24_{0,0}$ not containing aliasing components based on the formula (2) below:

$$X13_{0,0} = \frac{1}{4}\{(1-j)Y_0 + (1+j)Y_1 + (1-j)Y_2 + (1+j)Y_3\} \quad (1)$$

Here, $(1-j), (1+j), (1-j)$ and $(1+j)$ in the formula (1) are defined as $w_0, w_1, w_2$ and $W_3$ respectively.

$$X24_{0,0} = \frac{1}{4}\{(1+j)Y_0 + (1-j)Y_1 + (1+j)Y_2 + (1-j)Y_3\} \quad (2)$$

Here, $(1+J), (1-j), (1+j)$ and $(1-j)$ in the formula (2) are defined as $w_0', w_1', W_2'$ and $w_3'$ respectively.

Then, as shown in formula (3) below, the basic spectrum components $X13_{0,0}$ and $X24_{0,0}$ are added to generate the basic spectrum component $X_{0,0}$.

$$X_{0,0} = X13_{0,0} + X24_{0,0} \quad (3)$$

Below, the grounds of the above formulas (1) and (2) will be explained.

First, the theory behind the band broadening method using a plurality of discrete signals having differences in sampling phase in a two-dimensional direction constituting the grounds of the above formulas (1) and (2) will be explained.

The variables are defined below:

| | |
|---|---|
| S | total number of input digital signals (discrete signals) |
| L | indexes $0, 1, \ldots, S-1$ of digital signals |
| $Y\_org_L$ | L-th organization digital signal (frequency domain expression) |
| $y\_org_L$ | L-th organization digital signal (spatial domain expression) |
| $Y_L$ | L-th organization digital signal spatially shifted (frequency domain expression) |
| $y_L$ | L-th organization digital signal spatially shifted (spatial domain expression) |
| $\alpha_{xL}$ | sampling phase difference (rad) in the x-axis direction with respect to 0th organization signal of L-th organization digital signal |
| $\alpha_{yL}$ | sampling phase difference (rad) in the y-axis direction with respect to 0th organization signal of L-th organization digital signal |
| $X_{i,k}$ | imaging components $X(\omega_x - i\cdot\omega_{sx}, \omega_y - i\cdot\omega_{sy})$ of i-order in the x-direction and k-order in the y-direction, basic spectrum when $i = k = 0$ |

-continued

| | |
|---|---|
| $P_x$ | number of imaging components having negative order in the x-direction |
| $Q_x$ | number of imaging components having positive order in the x-direction |
| $P_y$ | number of imaging components having negative order in the y-direction |
| $Q_y$ | number of imaging components having positive order in the y-direction |
| $N_x$ | multiple indicating how many times of components with respect to Nyquist frequency were included in continuous signal input before being sampled in x-direction |
| $M_x$ | multiple indicating how many times of frequency components for restoration in the x-direction with respect to Nyquist frequency normally. $N_x = M_x$ |
| $N_y$ | multiple indicating how many times of components with respect to Nyquist frequency were included in continuous signal input before being sampled in y-direction |
| $M_x$ | multiple indicating how many times of frequency components for restoration in the y-direction with respect to Nyquist frequency, normally, $N_y = M_y$ |
| $W_L$ | complex number for multiplying with L-th organization digital signal in frequency domain |

A signal with sampling phase shifted by exactly $\alpha_x$ in the x-direction and $\alpha_y$ in the y-direction with respect to a reference discrete signal is, when indicating the reference discrete signal by the formula (4) below, indicated by the formula (5) below.

$$Y(\omega_x, \omega_y) = \sum_{i=-\infty}^{\infty} \sum_{k=-\infty}^{\infty} \times (\omega_x - i\omega_{sx}, \omega_y - k\omega_{sy}) \quad (4)$$

$$Y(\omega_x, \omega_y) = \exp(j \cdot (\omega_x \alpha_x + \omega_y \cdot \alpha_y)/2\pi) \cdot \quad (5)$$
$$\left( \sum_{i=-\infty}^{\infty} \sum_{k=-\infty}^{\infty} \exp(-j \cdot (i\alpha_x + k\alpha_y)) \times (\omega_x - i\omega_{sx}, \omega_y - k\omega_{sy}) \right)$$

Here, two-dimensional spatial shift can be attained by shifting to a correct position after Interpolation when in the spatial domain.

Also, when in the frequency domain, it is sufficient to multiply with "$\exp(-j(\omega x \cdot \alpha x + \omega y \cdot \alpha y)/(2\pi))$".

The spatial shift circuit can be realized for both the spatial domain and frequency domain.

For example, when performing two-dimensional spatial shift in the spatial domain, in FIG. 6, the Fourier transform circuit 51 and the spatial shift circuit 52 are switched. Namely, the Fourier transform is performed after spatial shift.

Next, consider a complex number simultaneous equation for obtaining a complex number $w_L$ to be multiplied with S number of discrete signals to reproduce basic spectrum components.

When in one dimension, the fact that the spectrum becomes symmetric between a positive frequency and a negative frequency based on the characteristics of a Fourier transform is used. It is sufficient to consider only a positive frequency and the number of imaging components in the positive range.

On the other hand, as in the present embodiment, when in two dimensions, due to the characteristics of a Fourier transform, conjugation occurs about the origin and not about the $\omega x$-axis or $\omega y$-axis. Namely, on a $\omega x$-$\omega y$ plane, the first and third quadrants are conjugated and the second and the fourth quadrants are conjugated. Namely, the two quadrants next to each other, for example, the first quadrant and the second quadrant, are independent from each other. Accordingly, it is necessary to consider the imaging components included in two quadrants, for example, the first and second quadrants. Note that the remaining two quadrants can be obtained by using the conjugated relationship.

Thus, let us consider the first and the second quadrants. First, consider the first quadrant. The number of discrete signals S necessary for obtaining solutions of a complex number simultaneous equation of the first quadrant becomes the product of the number of discrete signals necessary in the x-direction and the number of discrete signals necessary in the y-direction, that is, $S=(P_x+Q_x+1)\cdot(P_y+Q_y+1)$.

Here, $$P_x = \text{FLoor}((N_x-1)/2)$$

$$Q_x = \text{FLoor}((N_x+M_x-1)2)$$

$$P_y = \text{FLoor}((N_y-1)/2)$$

$$Q_y = \text{FLoor}((N_y+M_y-1)/2)$$

Note that in the present embodiment, when $N_x$, $N_y$, $M_x$, and $M_y$ are all "2", S becomes "4". If obtaining four organizations of continuous signals, the imaging components can be removed and a signal up double the Nyquist frequency can be obtained.

Accordingly, the complex number simultaneous equation can be indicated as the formula (6) below when the number of formulas and the unknown number of the basic spectrum components $X_{0,0}$ and imaging components $X_{i,k}$ are S and the discrete signal of the first and the third quadrants after spatial shifting is assumed to be $Y13_{i,k}$. By solving the formula (6) below to obtain the complex number $w_L$, the basic spectrum components of the first and the third quadrants can be obtained as shown in the formula (7) below. Note that $w_L$ in the formula (7) below indicates a complex number.

$$Y13_L = \sum_{i=-P_x,k}^{Q_x} \sum_{k=-P_y}^{Q_y} esp(-j \cdot (i\alpha_{xL} + k\alpha_{yL})) X_{i,k} \quad (6)$$

where, $L = 0, 1, \ldots, S-1$ $$X13_{0,0} = \sum_{i=0}^{S-1} W_L Y13_L \quad (7)$$

Next, if considering the second quadrant, $\omega_x$ is negative in the second quadrant and the imaging components in the x-direction also becomes a negative order. Therefore, the complex number simultaneous equation can be indicated as in the formula (9) below when assuming the number of formulas and the unknown number of basic spectrum components $X_{0,0}$ and imaging components $X_{i,k}$ to be S and assuming the discrete signals in the second and fourth quadrants after spatial shifting to be $Y24_L$. By solving the formula (8) below to obtain the complex number $w_L'$, the basic spectrum components $X24_{0,0}$ can be obtained as shown in the formula (9) below.

Note that $w_L'$ of the formula (9) below indicates a complex number different from $w_L$.

$$Y24_L = \sum_{i=-Qx}^{Px} \sum_{k=-Py}^{Qy} \exp(-j \cdot (i\alpha_{xL} + k\alpha_{yL}))X_{i,k} \quad (8)$$

where $L = 0, 1, \ldots, S-1$ $$X24_{0,0} = \sum_{i=0}^{S-1} w'_L Y24_L \quad (9)$$

The complex number $w_L$ obtained from the above is used for removing the imaging components in the first and third quadrants, while the complex number $w_L'$ is used for removing the imaging components in the second and the fourth quadrants.

Here, since the processing for removing the imaging components in the first and the third quadrants and the processing for removing the imaging components of the second and the fourth quadrants are independent, the signals are divided into two systems.

The processing for dividing the components into two systems generates a signal where the values of the second and fourth quadrants are replaced by "0" in the frequency domain and a signal where the values of the first and third quadrants are replaced by "0" in a frequency domain. On the other hand, when in a spatial domain, it generates a signal filtered for extracting the frequency components of the second and the fourth quadrants and a signal filtered for extracting frequency components of the first and third quadrants.

Multiplying the complex numbers $w_L$ and $w_L'$ respectively with the two organizations of signals gives the basic spectrum $X13_L$ of the first and third quadrants wherein imaging components are removed and the basic spectrum $S24_L$ of the second and fourth quadrants wherein imaging components are removed.

Finally, the basic spectrum $X13_L$ and the basic spectrum $X24_L$ from which the imaging components have been removed may be added to obtain the desired band broadened signal.

This completes the explanation of the theory behind the band broadening method.

Below, the grounds of the above formulas (1) and (2) will be explained based on the above theory of the band broadening method.

Namely, a case where imaging components are removed from R data of pixels at positions shown in FIG. 4B, obtained from the image signal S5 of the four captured images, to broaden the band and R data of pixels at positions shown in FIG. 1C are generated will be explained.

Note that the case where imaging components are removed from B data of pixels at positions shown in FIG. 4C, obtained from the image signal S5 of the four captured images, to broaden the band and B data of pixels at positions shown in FIG. 1D are generated is the same as the case of R data after removal of values of the sampling phase differences $\alpha_{xL}$, and $\alpha_{yL}$.

In the first and third quadrants, the formulas (10a) to (10d) are obtained from the above formula (6).

$$Y_0 = X_{0,0} - jX_{1,0} + X_{0,1} - jX_{1,1} \quad (10a)$$

$$Y_1 = X_{0,0} - X_{1,0} + jX_{0,1} - jX_{1,1} \quad (10b)$$

$$Y_2 = X_{0,0} - jX_{1,0} - X_{0,1} + jX_{1,1} \quad (10c)$$

$$Y_3 = X_{0,0} - X_{1,0} - jX_{0,1} + jX_{1,1} \quad (10d)$$

When solving the above formulas (10a) to (10d), the above formula (1) corresponding to the above formula (7) is introduced and the basic spectrum $X13_{0,0}$ of the first and third quadrants is obtained.

Regarding the second and fourth quadrants, the formulas (11a) to (11d) are obtained from the above formula (8).

$$Y_0 = X_{0,0} + jX_{1,0} + X_{0,1} + jX_{1,1} \quad (11a)$$

$$Y_1 = X_{0,0} - X_{1,0} + jX_{0,1} - jX_{1,1} \quad (11b)$$

$$Y_2 = X_{0,0} + jX_{1,0} - X_{0,1} - jX_{1,1} \quad (11c)$$

$$Y_3 = X_{0,0} - X_{1,0} - jX_{0,1} + jX_{1,1} \quad (11d)$$

When solving the above formulas (11a) to (11d), the above formula (2) corresponding to the above formula (9) is derived and the basic spectrum $X24_{0,0}$ of the second and the fourth quadrants is obtained.

The inverse Fourier transform circuit 54 performs inverse Fourier transform on the image signal S53 input from the basic spectrum calculation circuit 53 to obtain a band broadened digital signal S8.

The camera signal processor 9, taking account of the correlation of the colors, generates an interpolated RGB signal or a luminance signal and a color difference signal from R. G, B data included in the image signal S8 from the signal processor 8.

Below, the operation of an electronic still camera of the present embodiment shown in FIG. 2 will be explained.

The CCD image sensor 4 moves in a predetermined direction by an exactly predetermined distance by being driven by the CCD drive 6. As shown in FIG. 3, it therefore captures four images having mutually different sampling phases and outputs received light signals $S4_0$ to $S4_3$ based on the captured four images to the AD converter 5.

Next, the AD converter 5 converts the received light signals $S4_0$ to $S4_3$ to digital image signals $S5_0$ to $S5_3$ and outputs them to the signal processor 8. The image signals $S5_0$ to $S5_3$ are stored in the memory 7, then read and processed in the signal processor 8.

In the signal processor 8, first, the interpolation circuit 50 interpolates the input image signals $S5_0$ to $S5_3$ and up-samples them two-fold to generate the image signals $S50_0$ to $S50_3$.

Then, the Fourier transform circuit 51 performs two-dimensional Fourier transform on the image signals S500 to S503 to generate the image signals S510 to S513 of the frequency domain expression.

Then, the spatial shift circuit 52 multiples the R data and B data of the image signals S510 to S513 with $\exp(-j(\omega_x\alpha_{x0} + \omega_y\alpha_{y0})/(2\pi))$ to $\exp(-j(\omega_x\alpha_{x3} + \omega_y\alpha_{y3})/(2\pi))$ to generate the image signals $Y_0$ to $Y_3$.

The basic spectrum calculation circuit 53 uses the input image signals $Y_0$ to $Y_3$ and the complex numbers stored in the memory 7 shown in FIG. 2 to separately generate an image signal S53 composed of a two-dimensional image signal $X_{0,0}$ of the R data and B data and outputs the image signal S53 comprised of the generated image signal $X_{0,0}$ of the R data and B data and the G data of the pixels at positions shown in FIG. 4A to the inverse Fourier transform circuit 54.

The inverse Fourier transform circuit 54 performs an inverse Fourier transform on the input image signal S53 to broaden the band and generate a digital signal S8*b*.

The camera signal processor 9, taking account of the correlation of colors, processes the R, G, B data included in the image signal S8b to generate an interpolated RGB signal or a luminance signal and color difference signal.

Then, it outputs an image based on the generated RGB signal or the luminance signal and color difference signal.

As explained above, according to the electronic still camera of the present embodiment, it is possible to obtain a high definition image signal corresponding to double the numbers of pixels of the numbers of pixels of the CCD image sensor 4.

Also, according to the electronic still camera of the present embodiment, although the processing of the signal processor 8 becomes more complicated compared with that of the related art, as explained above, since it is not necessary to process the G data in the signal processor 8, the amount of data processing in the signal processor 8 can be reduced compared with a case where all the R, G and B data has to be processed.

Second Embodiment

FIG. 7 is a view of a part of the configuration of an electronic still camera of the present embodiment.

As shown in FIG. 7, the electronic still camera of the present embodiment is the same as that of the above explained first embodiment except for the processing in a signal processor 68.

Figure 8:
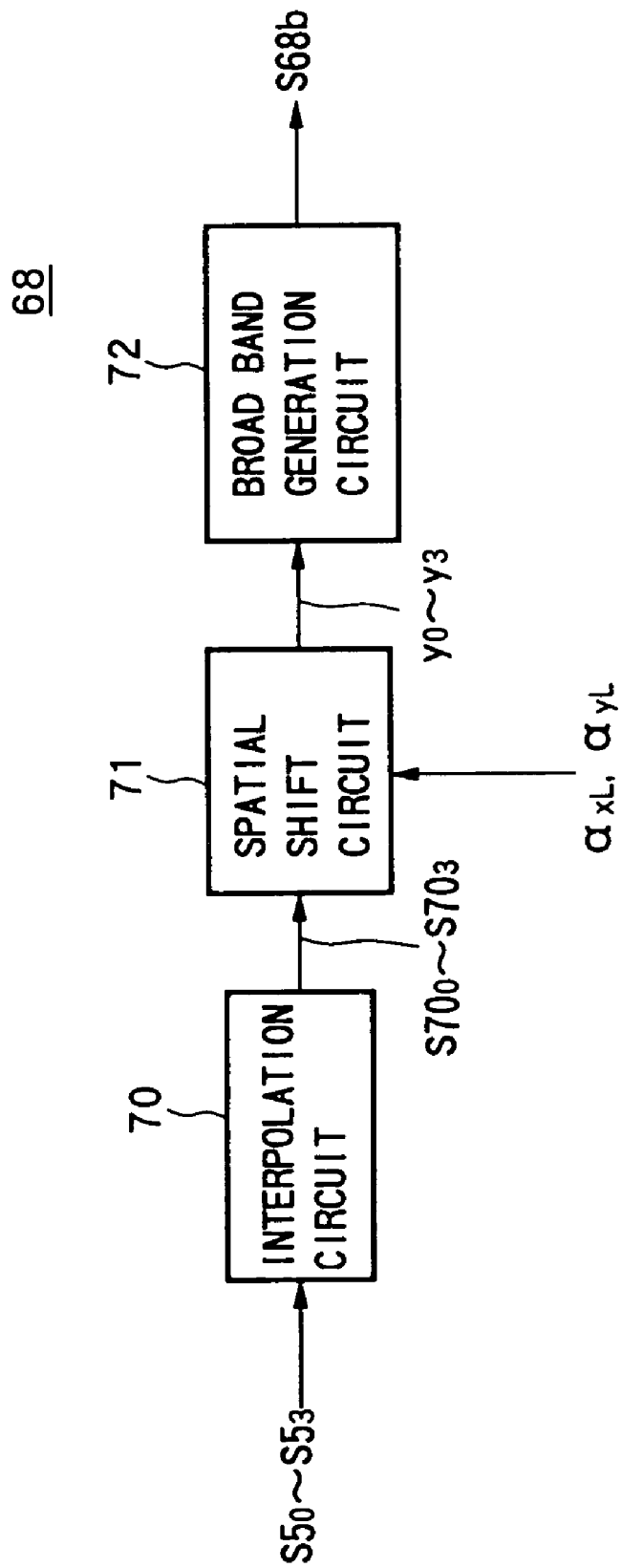
FIG. 8 is a view of the configuration of a signal processor shown In FIG. 7.

FIG. 8 is a view of the configuration of the signal processor 68 shown in FIG. 7.

As shown in FIG. 8, the signal processor 68 comprises an interpolation circuit 70, a spatial shift circuit 71, and a broad band signal generation circuit 72.

The interpolation circuit 70 interpolates the image signals $S5_0$ to $S5_3$ of the four captured images having different sampling phases shown in FIG. 3 input from the AD converter 5 shown in FIG. 7 to generate the image signals $S70_0$ to $S70_3$.

The spatial shift circuit 71 shifts the image signals $S70_0$ to $S70_3$ input from the interpolation circuit 70 in the x-direction and y-direction by exactly the amount of the phase difference to generate image signals $y_0$ to $y_3$ in order to express the fact that the input image signals $S70_0$ to $S70_3$ were sampled at the positions in FIGS. 4B and 4C.

Specifically, the spatial shift circuit 71 removes some samples from the top of the image signals S700 to $S70_3$ increased in the number of samples or adds some samples of appropriate values at the top to generate the signals $y_0$ to $Y_3$.

The spatial shift circuit 71 outputs the signals $y_0$ to $y_3$ to the broad band signal generation circuit 72.

The broad band signal generation circuit 72 divides the image signals $y_0$ to $y_3$ to components wherein both x and y have positive frequencies and components wherein one of x and y has a negative frequency and the other has the opposite positive frequency. Namely, it applies two-dimensional filtering for taking out frequencies wherein both x and y are positive and a two-dimensional filter for taking out frequencies wherein one of x and y has a negative frequency and the other has the opposite positive frequency. The signals obtained in this way are $y13_L$ and $y24_L$.

The broad band signal generation circuit 72 applies two-dimensional Hilbert transform on the image signals $y13_L$ and $y24_L$. Namely, it shifts the phase by $\pi/2$(rad) by a not shown phase shifting means. The thus obtained signals are respectively called $y13_L'$ and $y_L'$.

Then, the broad band signal generation circuit 72 uses real numbers indicating the real part and imaginary part of the complex number $w_L$ read from the memory 7 for $Y13_L$ and processes $[Re(w_L) \cdot y13_L + Im(w_L) \cdot y13_L']$. In the same way, it uses the real numbers indicating the real part and imaginary part of the complex number $w_L'$ read from the memory 7 for $Y24_L$ and processes $[Re(w_L') \cdot y24_L + Im(w_L') \cdot y\ 24_L']$.

Here, Re(x) indicates the real part and Im(x) indicates the imaginary part.

The broad band signal generation circuit 72 adds the results of $[Re(w_L) \cdot y13_L + Im(w_L) \cdot y13_L']$ and $[Re(w_L') \cdot y24_L + Im(w_L') \cdot y24_L']$ to cancel (remove) the aliasing to broaden the band and obtain the image signal S68.

Note that in the present embodiment, the real numbers indicating the real part and imaginary part of the complex numbers wL and wL' are stored in the memory 7 in advance.

The same effects can be obtained by the electronic still camera of the present embodiment as by the above explained electronic still camera of the first embodiment.

Third Embodiment

An electronic still camera of the present embodiment will be explained with reference to the case of using a CCD image sensor having a color compensating filter instead of a Bayer primary color filter array.

Figure 9:
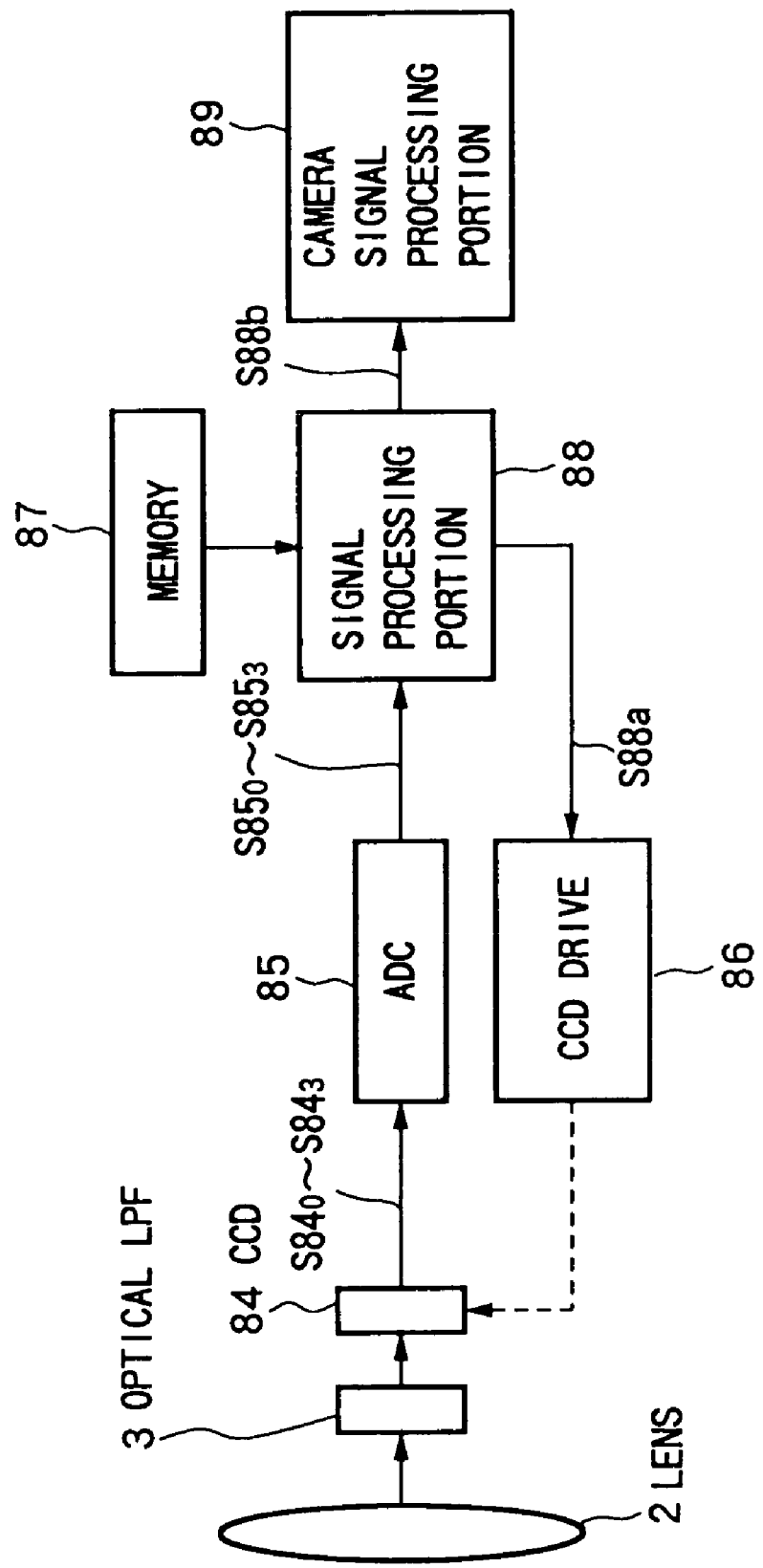
FIG. 9 is a view of a part of the configuration of an electronic still camera of a third embodiment of the present invention.

FIG. 9 is a view of a part of the configuration of an electronic still camera of the present embodiment.

As shown in FIG. 9, the electronic still camera 1 comprises a lens 2, an optical LPF 3, a CCD image sensor 84, an AD converter 5, CCD drive 86, a memory 87, a signal processor 88, and a camera signal processor 9.

[CCD Image Sensor 84]

The CCD image sensor 84 comprises a plurality of photodiodes arranged in a matrix and a color compensation filter. The color compensation filter comprises filters transmitting Cy (cyan) color, M (magenta) color, Y (yellow), color and W (white) color arranged in the pattern shown in FIG. 10A. A photodiode receives light passing through the color compensation filter, converts the result from light to an electrical signal to generate received light signals S840 to S843 based on the amount of light received, and outputs the received light signals S84 to the AD converter 5.

The CCD image sensor 84, as will be explained later on, is driven to move by the CCD drive 86, captures four images having mutually different sampling phases, and generates received light signals $S84_0$ to $S84_3$ in order to obtain a high resolution image shown in FIG. 10B. At this time, the sampling phases of the four images may be any phases. In the present embodiment, for example as shown in FIG. 10C, they are (0, 0), ($\pi/2$, 0), (0, $\pi/2$), and ($\pi/2$, $\pi/2$).

[AD Converter 85]

The AD converter 85 converts the received light signals $S84_0$ to $S84_3$ to digital image signals $S85_0$ to $S85_3$ and outputs the image signals $S85_0$ to $S85_3$ to the signal processor 88.

[CCD drive 86]

The CCD drive 86 physically moves the CCD image sensor 84 in a predetermined direction by an exactly predetermined distance based on a control signal S88a from the signal processor 88 so as to give a sampling interval of the CCD image sensor 84 of 2n and so that the CCD image sensor 84 captures a total of four images having the four different sampling phases shown in FIG. 10C.

[Signal processor 88]

The signal processor 88 uses the image signals S850 to S853 of the four captured images having the mutually different sampling phases shown in FIG. 10C input from the AD converter 85 to generate an image signal S88b of an image wherein the numbers of pixels in the vertical and horizontal directions are doubled.

Also, the signal processor 88 generates a control signal S88a based on information regarding a direction of movement and distance of the CCD image sensor 84 stored in the memory 87 in advance so that the four captured images having mutually different sampling phases shown in FIG. 10C can be obtained and outputs the control signal S88a to the CCD drive 86.

The signal processor 88 writes the image signals S850 to S853 of the four captured images of the pixel array pattern shown in FIG. 10A input from the AD converter 85 to the memory 87, then reads them and performs the later explained band broadening to generate an image signal S88b of a pixel array pattern shown in FIG. 10B.

Below, the processings for generating Cy data, Ye data, W data, and G data of the image signal S88b in the signal processor 88 will be explained.

Note that the processings for generating the Cy data, Ye data, W data, and G data are the same except for the values of the sampling phases.

Here, the sampling phase, as shown in FIG. 10C, has as its origin the position of a pixel outputting a color in accordance with the Cy data Specifically, for the Cy data, the sampling phases of the four captured images, as shown in FIG. 10C, respectively become $(\alpha_{x0}, \alpha_{y0})=(0, 0)$, $(\alpha_{x1} \cdot \alpha_{y1})=(\pi/2, 0)$, $(\alpha_{x2} \cdot \alpha_{y2})=(\pi/2, \pi/2)$, and $(\alpha_{x3} \cdot \alpha_{y3})=(0, \pi/2)$.

For the Ye data, the sampling phases of the four captured images respectively become $(\alpha_{x0}, \alpha_{y0})=(\pi/2, 0)$, $(\alpha_{x1} \alpha_{y1})=(\pi, 0)$, $(\alpha_{x2} \cdot \alpha_{y2})=(\pi/2, 0)$, and $(\alpha_{x3} \cdot \alpha_{y3})=(\pi, \pi/2)$.

For the W data, the sampling phases of the four captured images respectively become $(\alpha_{x0} \cdot \alpha_{y0})=(0, \pi/2)$, $(\alpha_{x1} \cdot \alpha_{y1})=(\pi/2, \pi/2)$, $(\alpha_{x2} \cdot \alpha_{y2})=(0, \pi/2)$, and $(\alpha_{x3} \cdot \alpha_{y3})=(\pi/2, \pi)$.

For the G data, the sampling phases of the four captured images respectively become $(\alpha_{x0} \cdot \alpha_{y0})=(\pi/2, \pi/2)$, $(\alpha_{x1}, \alpha_{y1})=(\pi, \pi/2)$, $(\alpha_{x2} \cdot \alpha_{y2})=(\pi/2, \pi)$, and $(\alpha_{x3} \cdot \alpha_{y3})=(\pi, \pi)$.

The values of these sampling phases are used as $(\alpha_{x0} \cdot \alpha_{y0})$ to $(\alpha_{x3} \cdot \alpha_{y3})$ at the time of the later explained spatial shifting and are stored in the memory 87 shown in FIG. 9 in advance.

Figure 11:
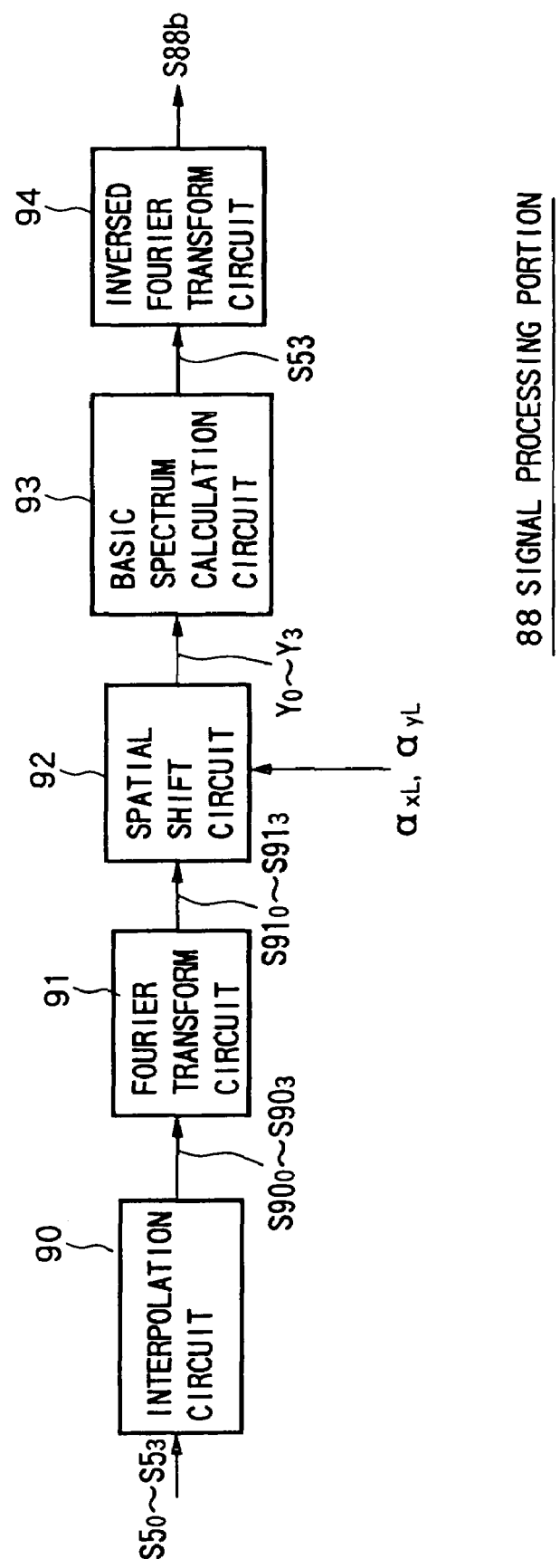
FIG. 11 is a view of the configuration of a signal processor shown in FIG. 9.
Figure 12A:
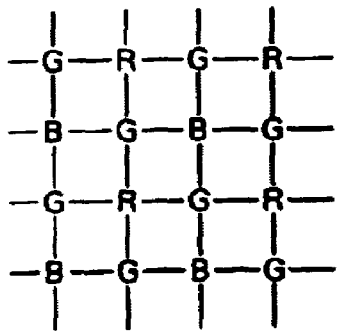
FIGS. 12A, 12B, 12C, 12D, 12E, 12F and 12G are views explaining disadvantages of the related art.
Figure 12B:
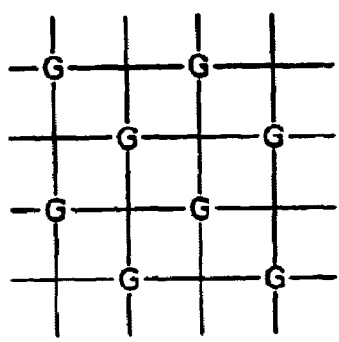
Figure 12C:
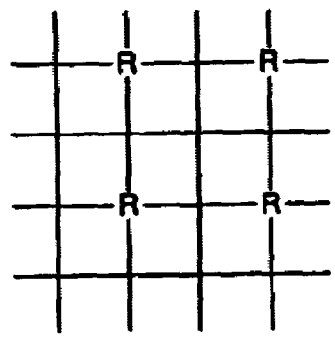
Figure 12D:
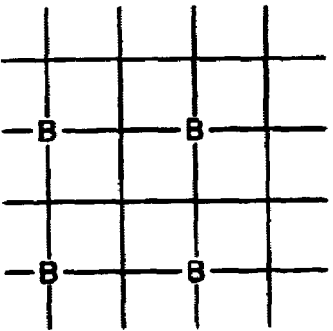
Figure 12E:
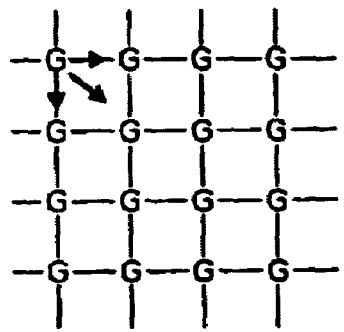
Figure 12F:
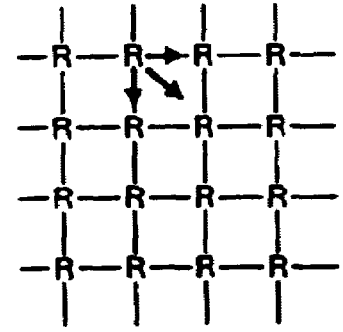
Figure 12G:
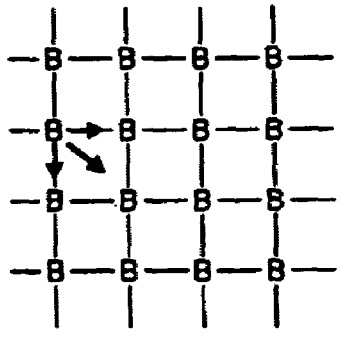

FIG. 11 is a view of the configuration of the signal processor 88.

As shown in FIG. 11, the signal processor 88 comprises an interpolation circuit 90, a Fourier transform circuit 91, a spatial shift circuit 92, a basic spectrum calculation circuit 93 and an inverse Fourier transform circuit 94.

The interpolation circuit 90 receives as inputs image signals S85$_0$ to S85$_3$, interpolates and up-samples these two-fold to generate image signals S90$_0$ to S90$_3$, and outputs the image signals S90$_0$ to S90$_3$ to the Fourier transform circuit 91.

The Fourier transform circuit 91 performs a two-dimensional Fourier transform on the image signals S90$_0$ to S90$_3$ input from the interpolation circuit 90 to generate image signals S91$_0$ to S91$_3$ of the frequency domain expression and outputs the image signals S91$_0$ to S91$_3$ to the spatial shift circuit 92.

The spatial shift circuit 92 performs two-dimensional spatial shifting of the Cy data, Ye data, W data, and G data included in the image signals S91$_0$ to S91$_3$ obtained by the imaging to generate the image signals Y$_0$ to Y$_3$ in order to express that sampling was performed at the above explained positions $(\alpha_{x0} \cdot \alpha_{y0})$ to $(\alpha_{x3} \cdot \alpha_{y3})$.

Namely, the spatial shift circuit 92 multiplies the Cy data, Ye data, W data, and G data of the image signals S91$_0$ to S91$_3$ with $\exp(-j(\omega_x \alpha_{x0}+\omega_y \alpha_{y0})/(2\pi))$ to $\exp(-j(\omega_x \alpha_{x3}+\omega_y \alpha_{y3})/(2\pi))$, respectively, to generate the image signals Y$_0$ to Y$_3$.

Note, in this case, the portion higher than the Nyquist frequency indicates negative frequencies both in the x-direction and y-direction. $\omega_x$ or $\omega_y$ in that portion have to be made $(\omega_x-\omega_{sx})$ or $(\omega_y-\omega_{sy})$. Here, $\omega_{sx}$ and $\omega_{sy}$ respectively are sampling frequencies in the x-direction and y-direction before up-sampling.

The basic spectrum calculation circuit 93 uses the image signals Y$_0$ to Y$_3$ input from the spatial shift circuit 92 and complex numbers stored in the memory 87 shown in FIG. 9 to separately generate two-dimensional image signals X$_{0,0}$ of the Cy data, Ye data, W data, and G data and outputs to the inverse Fourier transform circuit 94 an image signal S93 comprised by the generated image signals X$_{0,0}$ of the Cy data, Ye data, W data, and G data.

Note that the memory 87 stores, for the Cy data, Ye data, W data, and G data generated as will be explained later on, complex numbers $w_0$ to $w_3$ to be multiplied with the image signals Y$_0$ to Y$_3$ for obtaining the basic spectrum components X13$_{0,0}$ in the first and third quadrants and complex numbers $w_0'$ to $w_3'$ to be multiplied with the image signals Y$_0$ to Y$_3$ for obtaining the basic spectrum components X24$_{0,0}$ of the second and fourth quadrants.

The basic spectrum calculation circuit 93 obtains basic spectrum components X13$_{0,0}$ based on the formula (13) below obtained from the formulas (12a to 12d) below and obtains basic spectrum components X24$_{0,0}$ based on the formula (15) below obtained from the formulas (14a to 14d) below.

$$Y_0 = X_{0,0} + X_{1,0} + X_{0,1} + X_{1,1} \tag{12a}$$

$$Y_1 = X_{0,0} - jX_{1,0} + X_{0,1} - jX_{1,1} \tag{12b}$$

$$Y_2 = X_{0,0} + X_{1,0} - jX_{0,1} + jX_{1,1} \tag{12c}$$

$$Y_3 = X_{0,0} - jX_{1,0} - jX_{0,1} - X_{1,1} \tag{12d}$$

$$X13_{0,0} = \{-jY_0 + Y_1 + Y_2 + jY_3\}/2 \tag{13}$$

$$Y_0 = X_{0,0} + X_{1,0} + X_{0,1} + X_{1,1} \tag{14a}$$

$$Y_1 = X_{0,0} + jX_{1,0} + X_{0,1} + jX_{1,1} \tag{14b}$$

$$Y_2 = X_{0,0} + X_{1,0} - jX_{0,1} - jX_{1,1} \tag{14c}$$

$$Y_3 = X_{0,0} + jX_{1,0} - jX_{0,1} + X_{1,1} \tag{14d}$$

$$X24_{0,0} = \{Y_0 - jY_1 + jY_2 + jY_3\}/2 \tag{15}$$

Then, as shown in the formula (16) below, the basic spectrum components X13$_{0,0}$ and X24$_{0,0}$ are added to generate the basic spectrum components X$_{0,0}$.

$$X_{0,0} = X13_{0,0} + X24_{0,0} \tag{16}$$

Also, the basic spectrum calculation circuit 93, in the same way as for the Cy data, obtains basic spectrum components X13$_{0,0}$ and basic spectrum components X24$_{0,0}$ for the Ye data, W data, and G data, and adds them to generate basic spectrum components X$_{0,0}$.

The inverse Fourier transform circuit 94 performs an inverse Fourier transform on the image signal S93 input from the basic spectrum calculation circuit 93 to broaden the band and obtain the digital signal S88b.

The camera signal processor 89 processes the Cy data, Ye data, W data, and G data included in the image signal S88b from the signal processor 88 to generate an interpolated RGB signal included or generate a luminance signal and color difference signal taking into account the correlation of the colors.

Next, the operation of the electronic still camera of the present embodiment shown in FIG. 9 will be explained.

The CCD image sensor 84 is driven by the CCD drive 86 to move in a predetermined direction by exactly a predetermined distance, captures four images having mutually different sampling phase as shown in FIG. 10C, and outputs the received light signals $S84_0$ to $S84_3$ based on the four captured images to the AD converter 85.

Next, the AD converter 85 converts the received light signals $S84_0$ to $S84_3$ to digital image signals $S85_0$ to $S85_3$ and output them to the signal processor 88. The image signals $S85_0$ to $S85_3$ are stored in the memory 87, then read and processed in the signal processor 88.

In the signal processor 88, first the interpolation circuit 90 interpolates and up-samples two-fold the input image signals $S85_0$ to $S85_3$ to generate the image signals $S90_0$ to $S90_3$.

Then, the Fourier transform circuit 91 applies a two-dimensional Fourier transform to the image signals $S90_0$ to $S90_3$ to generate image signals $S91_0$ to $S91_3$ of the frequency domain expression.

Then, the spatial shift circuit 92 multiplies the Cy data, Ye data, W data, and G data of the image signals $S91_0$ to $S91_3$ with $\exp(-j(\omega_x \alpha_{x0} + \omega_y \alpha_{y0})/(2\pi))$ to $\exp(-j(\omega_x \alpha_{x3} + \omega_y \alpha_{y3})/(2\pi))$ to generate the image signals $Y_0$ to $Y_3$.

The basic spectrum calculation circuit 93 uses the input image signals $Y_0$ to $Y_3$ and the complex numbers stored in the memory 87 shown in FIG. 9 to separate generate two-dimensional image signals $X_{0,0}$ of the Cy data, Ye data, W data, and G data and outputs an image signal S93 comprised of the generated image signals $X_{0,0}$ of the Cy data, Ye data, W data, and G data to the inversed Fourier transform circuit 94.

The inverse Fourier transform circuit 94 applies an inverse Fourier transform to the input image signal S93 to broaden the band and generate the digital signal S88b.

The camera signal processor 89 processes the Cy data, Ye data, W data, and G data included in the image signal S88b to generate an interpolated RGB signal or generate a luminance signal and color difference signal taking into account the correlation of the colors.

Then, it outputs an image in accordance with the generated RGB signal or the luminance signal and color difference signal.

As explained above, according to the electronic still camera of the present embodiment, even when using a CCD image sensor 84 having the above color compensation filter, a high definition image. signal corresponding to double the number of pixels of the CCD image sensor 84 both in the vertical and horizontal directions can be obtained without complicated processing in the camera processor 89.

The present invention is not limited to the above embodiments.

For example, the orders of processing in the signal processor 8 shown in FIG. 2, the signal processor 68 shown in FIG. 7 and the signal processor 88 shown in FIG. 9 are not specifically limited to the above.

Also, the hardware configuration is not limited to that in FIGS. 2, 7, and 9.

Also, in the present invention, processing in a spatial domain and processing in a frequency domain can be mixed together.

Furthermore, in the above embodiments, the CCD image sensors 4 and 84 were physically moved to obtain four captured images having different sampling phase, however, a plurality of captured images having different sampling phases may be obtained by for example optically or electrically changing a light path by using a birefringent plate without physically moving the CCD image sensor.

Also, the values of the sampling phases are not limited to those described in the embodiments.

Also, a CCD image sensor was shown as an example of an imaging means in the above embodiments, however, a CMOS sensor etc. may also be used.

Also, in the above embodiments, a case where four captured images are used for obtaining a high resolution image (broadened band) doubled in the vertical and horizontal directions was shown as an example, but the increase in resolution is not particularly limited to two. Further, the increase in resolution may be different between the vertical direction and in the horizontal direction. Also, the band broadening may be not two dimensional, but also one dimensional.

Also, in the above embodiments, four captured images were used in order to obtain a high resolution image, however, the number of captured images used is not limited to four since it depends on the multiple in each directions.

Figure 10A:
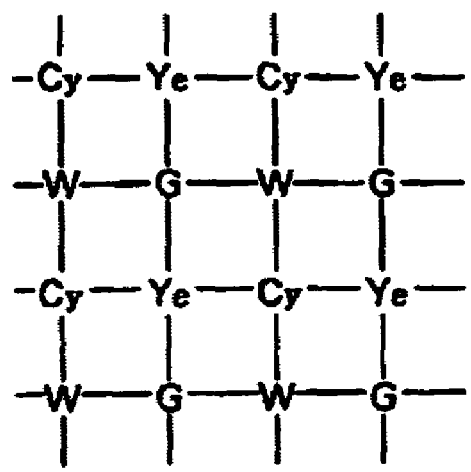
FIGS. 10A, 10B, and 10C are views for explaining a color compensating filter used in the CCD image sensor shown in FIG. 9.
Figure 10B:
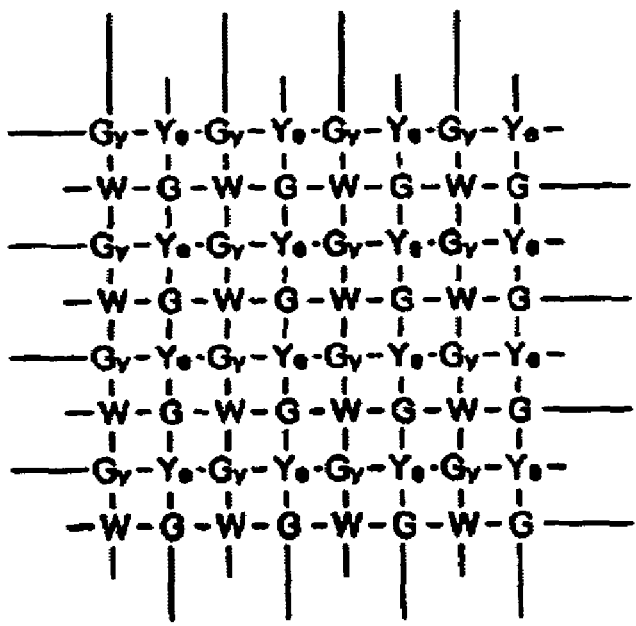
Figure 10C:
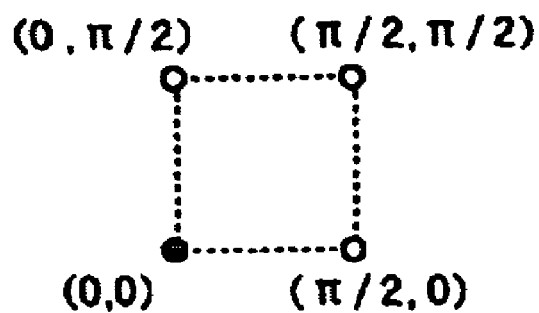

Also, the arrays of the colors of the color filters shown in FIG. 1A and FIG. 10A can be any arrays.

The phase shift means used in the spatial domain is not limited to the Hilbert transform and the amount of phase shift is not limited to $\pi/2$.

Summarizing the effect of the invention, as explained above, according to the signal processing apparatus and the method of the present invention, a signal can be broadened in band by simple processing.

Also, according to the image processing apparatus and the method of the present invention, a high resolution image can be obtained from a low resolution image by simple processing.

While the invention has been described with reference to specific embodiment chosen for purpose of illustration, it should be apparent that numerous modifications could be made thereto by those skilled in the art without departing from the basic concept and scope of the invention.

What is claimed is:

1. A signal processing apparatus, comprising:
   a transforming means for transforming a plurality of first digital signals having mutually different sampling phases to a plurality of second digital signals in a frequency domain;
   a memory means for storing a plurality of complex numbers corresponding to said sampling phases; and
   a processing means for multiplying said plurality of second digital signals and said plurality of complex numbers corresponding to the plurality of second digital signals and adding the multiplied results to generate a third digital signal free from aliasing components.

2. A signal processing apparatus as set forth in claim 1, further comprising:
   a phase shift means for shifting the phase of said first digital signals or said second digital signals by exactly a predetermined phase.

3. An image processing apparatus, comprising:
   an image input means for generating a plurality of first image signals having mutually different sampling phases in accordance with imaging results;
   a transforming means for transforming the first image signals to a plurality of second image signals in a frequency domain;

a memory means for storing a plurality of complex numbers corresponding to said sampling phases;

a processing means for multiplying said plurality of second image signals with said plurality of complex numbers corresponding to the plurality of second image signals and adding the multiplied results to generate third image signals free from aliasing components.

4. An image processing apparatus as set forth in claim 3, wherein:

said image input means forms an image of a plurality of color lights passed through a single-plate type color filter on corresponding pixels among a plurality of pixels arranged in a matrix two-dimensionally to generate said first image signals comprised by color data of said plurality of colors; and said processing means performs said multiplication and said addition for every color data of said plurality of color data to generate a plurality of fourth image signals corresponding to said plurality of colors and generates said third image signals by using the plurality of fourth image signals.

5. An image processing apparatus as set forth in claim 4, wherein:

said sampling phase is determined for a predetermined one color among said plurality of colors in order that a sampling pattern of color data of the color included in said plurality of first image signals and a sampling pattern of color data included in said fourth image signals of the color become similar.

6. An image processing apparatus as set forth in claim 3, wherein said processing means comprises:

a spatial shift means for spatially shifting said second image signals in accordance with said sampling phases;

a basic spectrum calculation means for multiplying said spatially shifted plurality of second image signals with said plurality of complex numbers corresponding to said plurality of second image signals and adding the multiplied results to calculate a basic spectrum free from aliasing components; and an inverse transforming means for transforming said basic spectrum from a frequency domain to a time domain to generate said third image signals.

7. An image processing apparatus as set forth in claim 3, further comprising:

a drive means for moving said image input means physically, optically, or electrically so that said imaging means can generate a plurality of image signals having mutually different sampling phases in accordance with the imaging results.

8. An image processing apparatus as set forth in claim 4, wherein:

said image input means is a single-element CCD image sensor and said color filter is a primary color filter or a color compensation filter.

9. A computer-readable medium containing instructions for controlling a signal processing system to perform a method, the method comprising the steps of:

transforming a plurality of first digital signals of an image having mutually different sampling phases to a plurality of second digital signals in a frequency domain;

multiplying said plurality of second digital signals with a plurality of complex numbers corresponding to the plurality of second digital signals; and adding the multiplied results to generate third digital signals free from aliasing components.

10. A computer-readable medium containing instructions for controlling an image processing system to perform a method, the method comprising the steps of:

generating a plurality of first image signals having mutually different sampling phases in accordance with imaging results;

transforming the first image signals to a plurality of second image signals in a frequency domain; and multiplying said plurality of second image signals with a plurality of complex numbers corresponding to the plurality of second image signals and adding the multiplied results to generate third image signals free from aliasing components.

11. A computer-readable medium as set forth in claim 10, further comprising the steps of:

forming an image of a plurality of color lights passing through a single-plate type color filter on corresponding pixels among a plurality of pixels arranged in a matrix two-dimensionally to generate said first image signals comprised by color data of said plurality of colors and performing said multiplication and said addition for every color data of said plurality of colors to generate a plurality of fourth image signals corresponding to said plurality of colors and generate said third image signals by using the plurality of fourth image signals.

12. A computer-readable medium as set forth in claim 11, further comprising the steps of determining said sampling phase for a predetermined one color among said plurality of colors so that a sampling pattern of color data of the color included in said plurality of first image signals and a sampling pattern of color data included in said fourth image signals of the color become similar.

* * * * *